(12) United States Patent
Longoni et al.

(10) Patent No.: US 7,797,012 B1
(45) Date of Patent: Sep. 14, 2010

(54) METHOD OF CONTROLLING POWER

(75) Inventors: Fabio Longoni, Espoo (FI); Oscar Salonaho, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/980,377

(22) PCT Filed: May 9, 2000

(86) PCT No.: PCT/EP00/04230

§ 371 (c)(1),
(2), (4) Date: Mar. 20, 2002

(87) PCT Pub. No.: WO00/76083

PCT Pub. Date: Dec. 14, 2000

(30) Foreign Application Priority Data

Jun. 2, 1999 (GB) .................................. 9912846.4

(51) Int. Cl.
*H04W 52/04* (2009.01)
(52) U.S. Cl. .................... 455/522; 455/69; 455/442
(58) Field of Classification Search .............. 455/522, 455/517, 69, 504–506, 63.1, 63.2, 67.11, 455/67.13, 515; 375/135, 146, 295
See application file for complete search history.

(56) References Cited

U.S. PATENT DOCUMENTS

| | | | |
|---|---|---|---|
| 5,267,262 A | 11/1993 | Wheatley, III et al. ......... 375/1 |
| 6,032,052 A | 2/2000 | Richardson ................. 455/522 |
| 6,085,107 A * | 7/2000 | Persson et al. ............... 455/522 |
| 6,094,563 A | 7/2000 | Kakizawa ..................... 455/69 |
| 6,259,927 B1 * | 7/2001 | Butovitsch et al. ........... 455/522 |
| 6,275,487 B1 * | 8/2001 | Szalajski et al. ......... 455/515 X |
| 6,347,083 B1 * | 2/2002 | Nishino ..................... 455/69 X |
| 6,498,785 B1 * | 12/2002 | Derryberry et al. ..... 455/522 X |
| 2002/0077138 A1 * | 6/2002 | Bark et al. ................... 455/522 |

FOREIGN PATENT DOCUMENTS

| | | |
|---|---|---|
| CA | 2 485 901 A1 | 10/1998 |
| EP | 0 718 985 A2 | 6/1996 |
| EP | 0 758 168 A1 | 2/1997 |
| EP | 0 892 572 A1 | 2/1999 |
| EP | 0 977 393 A1 | 2/2000 |
| EP | 1 047 206 A1 | 10/2000 |
| JP | 08-223112 | 8/1996 |
| JP | 09-107328 | 4/1997 |
| JP | 11-075253 | 3/1999 |
| JP | 75253/1999 | 3/1999 |
| WO | WO 98/28859 | 7/1998 |
| WO | WO 98/47246 A1 | 10/1998 |

OTHER PUBLICATIONS

"Transport channels and physical channels (TDD)", 3GPP RAN WG1 (S1.21) Vo.1.1, Feb. 1999, pp. 1-24.
"Utra FDD; Physical layer procedures", 3GPP TS25.214 V1.0.0, Apr. 1999, pp. 1-31.

* cited by examiner

*Primary Examiner*—Philip J Sobutka
(74) *Attorney, Agent, or Firm*—Harrington & Smith

(57) ABSTRACT

A method of controlling power with which information is transmitted by a first station (4) to a plurality of second stations (6) on a common channel, different information being intended for different stations, said method comprising the step of transmitting said information in said common channel, wherein information intended for different second stations (6) are transmitted at different power levels.

35 Claims, 2 Drawing Sheets

METHOD OF CONTROLLING POWER

FIELD OF THE INVENTION

The present invention relates to a method of controlling power with which information is transmitted in a common channel. The method may, but not necessarily be used in a wireless cellular system. The information may, but not necessarily be frames of data.

BACKGROUND OF THE INVENTION

The use of code division multiple access (CDMA) is being proposed for the next generation of cellular telecommunication networks. Additionally, code division multiple access is also being used in the IS-95 Standard in the USA. CDMA is a direct sequence spread spectrum technique. In a wireless cellular network using CDMA, the mobile terminals in one cell associated with a first base station will use the same frequency as mobile stations in an adjacent cell associated with a second base station. The different mobile stations can be distinguished by the respective base stations as each mobile station will be using a different spreading code.

In the proposals for the wideband CDMA standard, it has been proposed that a mobile station or other user equipment in a RACH (random access channel)/FACH (forward access channel) state use the uplink RACH channel to transmit data or messages to a base station and listen to the downlink FACH for data or messages from the base station. In the RACH/FACH there is little or not data being transmitted between the mobile station and the base station such that no dedicated channels have been set up therebetween. The FACH and RACH channels are both common channels which means that all the user equipment including mobile stations in a cell associated with a given base station will use these channels.

The data is sent in data frames. Data frames sent from the base station to the mobile stations will include the identity of the user equipment, for example the identity of a mobile station. Each mobile station will receive all the data frames sent from a base station to the mobile station on the FACH. Each mobile station is able to identify the data frame intended for that mobile station by the identity included in the frame. The frames sent from the mobile station include information identifying the source of the frames.

As a number of mobile stations or user equipment share the FACH channel it is difficult to set the power level of that channel such that it is at the lowest possible level and at a level such that all the mobile stations can receive the signals from the base station. In CDMA systems, the number of users which can be supported by the system with a given quality of service depends on the total signal power of all the users and the base station in a cell. If the total signal power is relatively high, this will provide a relatively high level of interference. This means that it may be difficult to distinguish the desired signal from the interference resulting from the other base stations. Accordingly minimisation of the power used by each user and the base station will improve the capacity and/or quality of service.

EP-A-0-892572 describes a BCCH carrier supporting a physical BCCH such that at least one BCCH timeslot is entirely received within one of the successive monitoring windows of a mobile station of an adjoining cell.

SUMMARY OF THE INVENTION

It is an aim of embodiments of the present invention to provide a method which addresses this problem.

According to one aspect of the present invention, there is provided a method of controlling power with which information is transmitted by a first station to a plurality of second stations on a common channel, different information being intended for different stations, said method comprising the step of transmitting said information in said common channel, wherein information intended for different second stations are transmitted at different power levels.

The power level with which information is transmitted is preferably selected in dependence on a parameter of the intended second station and/or the content of the information. The information may be transmitted in the channel with the higher power if the content of the information is relatively important. Preferably, the information is in the form of data packets.

The information for a given second station may include information identifying the given station. A second mode of operation may be provided in which the first station sends information to the second stations with substantially the same power level, one of the first and second modes being selected.

The first station may receive information from a controller on the power with which information for a respective second station is to be transmitted. The controller may be arranged to send a channel configuration message to the first station to control which of the first and second modes is to be used. The first station may be arranged to send a message to the controller advising the controller if it can perform the mode contained in the channel configuration message. The controller may be arranged to send a channel configuration message to the first station to advise the first station as to the range of power levels which are to be used to transmit information to the second station.

Values representing the power values may be sent to the first station by the controller, the values being mapped to the power levels which are used by the first station to transmit information to the second station.

Preferably, the controller is a radio network controller. This may be in a CDMA network, such as the UMTS network. The first station may be a base station. The second station may comprise mobile stations or any other suitable form of user equipment.

The common channel may be a forward access channel.

According to a second aspect of the present invention, there is provided a method of controlling power with which information is transmitted by a first station to a plurality of second stations on a common channel, different information being intended for different stations, said method comprising a first mode in which the information is transmitted with a the same power and a second mode in which different powers are used for information intended for different second stations.

According to a third aspect of the present invention, there is provided a network comprising a first station and a plurality of second stations, said first station being arranged to transmit different information intended for different second stations on a common channel, said first station have a mode of operation in which said first station is arranged to transmit information intended for different second stations on the common channel at different power levels, and a controller which is arranged to supply information as to the power to be used for said information to said first station.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF PREFERRED EMBODIMENTS

Figure 1:
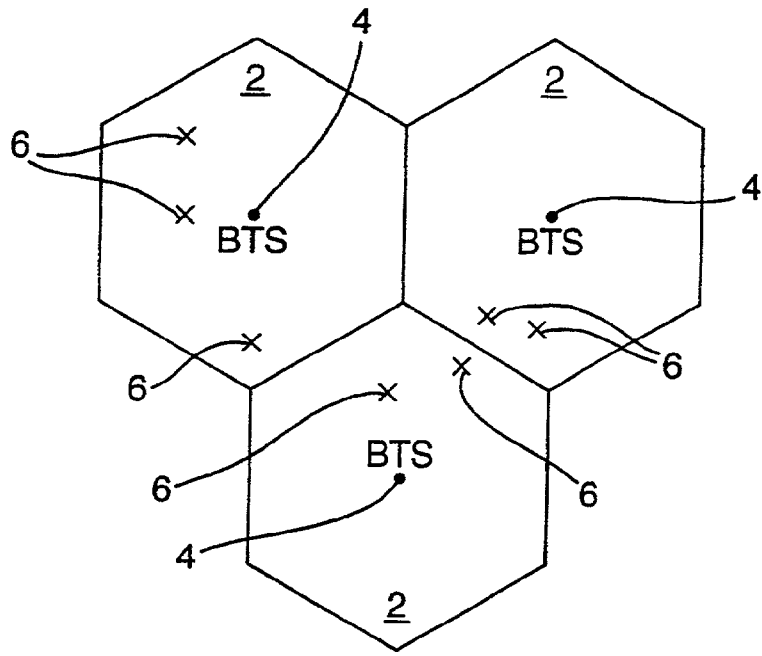
FIG. 1 shows a schematic diagram of part of a cellular telecommunications network incorporating base transceiver stations and mobile stations.

Reference will first be made to FIG. 1 in which three cells 2 of a cellular telecommunications network are shown. Each cell 2 is served by a respective base transceiver station (BTS) 4. Each base transceiver station 4 is arranged to transmit signals to and receive signals from the mobile stations 6 located in the cell associated with the given base transceiver station 4. Likewise, each mobile station 6 is able to transmit signals to and receive signals from the respective base transceiver station 4.

The cellular telecommunications network shown in FIG. 1 uses a code division multiple access technique.

Figure 2:
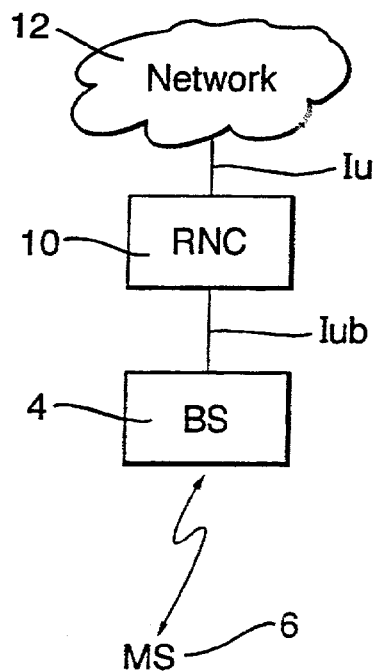
FIG. 2 shows the hierarchy of elements of the network of FIG. 1.

Reference is mode to FIG. 2 which shows the hierarchy of a CDMA system. As can be seen, the mobile station 6 is in wireless communication with the base station. Typically a number of mobile stations will be in communication with each base station although only one mobile station is shown in FIG. 2 for clarity. The base station 4 is connected to a radio network controller RNC 10. Again more than one base station is usually connected to each RNC 10 although only one is shown for clarity. Typically more than one RNC is provided in a network. The RNC 10 is connected to other elements of the network 12.

The RNC 10 is arranged to control the base station and also passes on the data packets to be transmitted to the mobile station by the base station. The RNC 10 will also receive from the base station packets of data which it has received from the mobile station.

Common channels are defined between the mobile stations in the cell associated with a given base station and the given base station. These common channels are the forward access channel (FACH) in the downlink direction and the random access channel (RACH) in the uplink direction. The common channel may alternatively be a downlink shared channel to which a number of mobile stations are allocated. With common channels the same spreading code is used for all communications on a given channel. As mentioned hereinbefore, the data sent to the mobile station and the data sent from the mobile station is in packet form. The data packets which are sent to the mobile stations on the FACH will include information identifying the mobile station for which a given packet is intended. A mobile station will receive all the packets sent on the common FACH channel and is able to identify the packets which are intended for it from the information identifying the mobile station. Similarly packets of data which are transmitted to the base station by the mobile stations on the common RACH channel will include information in the data packet which allows the base station to identify from which mobile station the data packet had been received.

The mobile stations and the base stations use the common channels when the amount of data is small and/or sporadic. This means that dedicated channels do not then need to be established. This increases the radio resources available so that more users can be supported and/or the quality of the users is improved.

The base station receives the frames in the RACH channel from the mobile stations and forwards these frames to the RNC 10 via the Iub interface between the base station 4 and the RNC 10. The packets of data to be transmitted to the mobile station on the FACH channel are received by the base station from the RNC 10. The packets are transferred from the RNC 10 to the base station 4 via the Iub interface. For the transmission of packets between the base station 4 and the RNC 10, the CCH (common channel) frame protocol is used. The frame structure used for the communication of the data between the RNC 10 and the base station 4 will be described hereinafter.

In the embodiments of the invention the power at which the FACH is transmitted is set at the minimum value which allows the frames to be correctly received at the mobile stations. The power level at which the frames are sent should be such that the mobile stations can receive the frames within the cell and that the degree of interference caused in other cells is as low as possible. Additionally the interference to other users in the cell should be minimised. This allows transmission resources to be saved.

In a first embodiment of the present invention, fixed power control is used. The FACH channel is configured in the base station. This differs from the second embodiment where the FACH channel is set up by the RNC 10. The configuring of the FACH channel in the base station can be done with a layer 3 message over the Iub interface which is between the base station and the RNC. Alternatively, the configuring of the FACH channel in the base station can be done in response to O&M (operation and maintenance) procedures.

In the fixed power control mode, a constant value for the FACH channel transmission power is set. This set power level is used for every frame transmitted on the FACH channel. In other words all of the frames transmitted by the base station in the FACH channel will have the same transmitted power regardless of the mobile station for which the data frame is intended. The power is thus constant for each FACH channel frame and for each mobile station.

The power value set by the RNC can be modified by the base station if required. For example if conditions change or if the base station receives requests to increase its power from the mobile stations, the power level may be altered.

Any suitable method can be used to determine the power at which the FACH channel is to be transmitted. For example, the base station can measure the received signal strength from the mobile stations and select a signal strength based on the received signals. Alternatively, if the base station knows the location of the mobile stations, the signal strength can be selected such that the mobile station which is furthest from the base station receives the frames with the minimum level required. Any other suitable method can be used to determine the power which takes into account at least one parameter relating to the mobile stations. In preferred embodiments of the present invention the value used to transmit the frames to the mobile stations is always the same but will vary in order to take into account changes in the cell.

In a second embodiment of the present invention, dynamic power control is used. In dynamic power control the power with which each frame is transmitted is varied in dependence on a parameter of the destination mobile station. Thus the power at which data frames are transmitted may vary from frame to frame. In this embodiment, when the forward access channel is to be set up, it is indicated to the base station that the power with which each frame is to be transmitted is set by the RNC 10. This information may be provided from the RNC 10 to the base station via the Iub interface or in any other suitable manner.

The RNC 10 receives information from the mobile stations via the base station. This information may include measurement reports where the mobile station provides information on the strength with which it receives signals from the base station. Alternatively or additionally, the RNC 10 may receive information from the base station as to the strength with which it has received signals from the mobile station. Either or both of these types of information allow the RNC 10 to determine an appropriate power level with which a given frame should be transmitted to a given mobile station on the FACH. This type of power control is referred to as open loop power control.

Any other suitable information may be supplied to the RNC 10 in order to allow it to determine a suitable power level. This may be in addition to or as an alternative to the received signal strength report(s). For example, the received signal strength reports may include an indication as to the quality of the signal. The RNC 10 may use information on the position of the mobile station to determine the strength with which frames are transmitted to the mobile station. The position may be obtained from information provided by the base station and/or the mobile station.

The base station may in certain circumstances alter the power set by the RNC 10. The base station may take into account other factors in modifying the power with which it transmits to the mobile stations. These factors can for example take into account the conditions in the cell, the location of the mobile station in the cell, the total amount of traffic or users in the cell or the like. Alternative the power level can be altered in response to the strength of signals received at the base station.

The power used for the transmission of a frame may be selected in accordance with the importance of the data contained within the frame. If the data contained in the frame is relatively important the power with which that frame is transmitted can be increased. Based on the determination made by the RNC 10, a power is determined which is the power with which a given frame is to be transmitted to the mobile station. This power level is inserted in the CCH frame protocol frame and is sent to the base station 4. The base station 4 uses this power level to transmit the associated frame to the mobile station on the common channel FACH. The power level sent by the RNC 10 to the base station can be the actual power level to be used. However in preferred embodiments of the invention, the power level can be sent as a coded value. This coded value is received by the base station and is mapped onto the actual power level using the maximum and minimum power limits.

Figure 3:
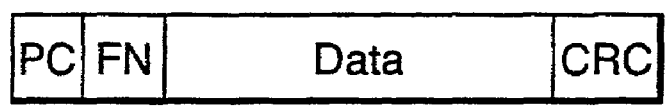
FIG. 3 shows a schematic view of a frame to be sent on the FACH channel from a base station to a mobile station.

In the FACH channel set up message sent from the RNC 10 to the base station 4, there is an indication as the maximum and minimum transmission power levels which are forwarded to the base station for the packets transmitted passed from the RNC 10 to the base station 4. The CCH frame protocol frames from the RNC to the base station contain the power level to be used by the base station for the transmission of the frame in the FACH channel. The structure of the frame sent from the RNC 10 to the base station 4 is shown in FIG. 3. The frame contains information on the power level PC, the data DATA, the frame number FN and an error correction part CRC.

Figure 4:
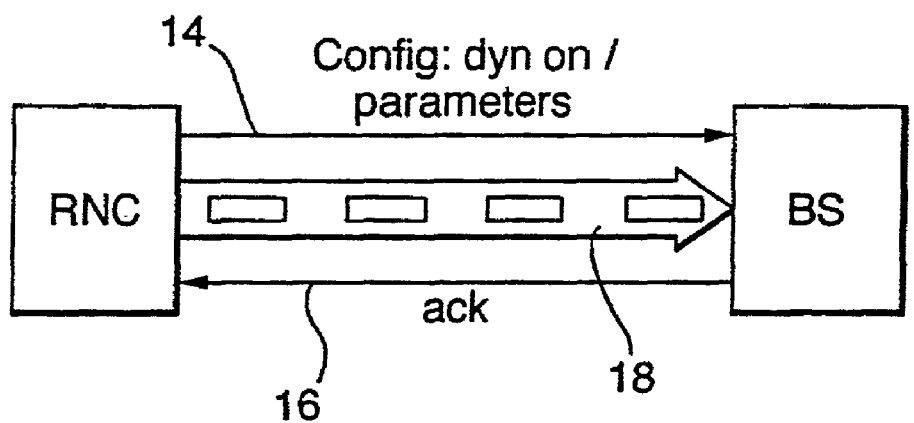
FIG. 4 shows a schematic view of the transfer of information between a RNC (radio network controller) and the base station.

In a third embodiment of the present invention, the FACH may sometimes use fixed power control and at other times may use dynamic power control. This third embodiment will be described in relation to FIG. 4.

In this third embodiment, the FACH channel set up message 14 sent from the RNC 10 to the base station 4 will include an indication if fixed or dynamic power control is used. The set up message may have a power mode bit which has one value if fixed power control is used and another value if dynamic power control is used. The base station will send an acknowledgement message advising the RNC that it has understood which mode is to be used and that the FACH channel is to be set up.

If the set up message from the RNC 10 to the base station 4 does not include any indication as to the power control mode, it may be assumed that the dynamic power control mode is being used. It should be noted that if the RNC 10 is arranged to always provide power control information to the base station, the RNC can provide constant power control values in the fixed power control mode and varying power control values in the normal mode. In this latter case, the base station would not need to be advised of the mode.

If the base station is not able to support one of the modes, the base station will advise the RNC of this in the acknowledgement message which it sends to the RNC 10.

A given base station may not be able to support one of the modes, probably the dynamic mode. In that case, the other mode will be used. In a network some base stations will be able to use both modes whilst other base stations will only be able to support one or other of the modes.

In a default mode of operation, the power used to transmit the FACH channel may be set to a default value. This default value may be relatively high to ensure that all the mobile stations are able to receive their data frames. This default mode may be provided in any of the three embodiments described hereinbefore. One or other of the dynamic and fixed power control modes may be a default mode.

The frame protocol used may have any suitable format. For example the frame protocol may be in accordance with the 25.435 and 25.437 standards of the UMTS (universal mobile telecommunications system).

In this description, reference has been made to mobile stations. However, it should be appreciated that embodiments of the present invention are applicable to any other type of user equipment which communicates with the base station or similar station using radio waves or the like. The user equipment may in some embodiments of the invention be computer terminals or the like. The user equipment need not be mobile.

It should be appreciated that in the new CDMA standard, base stations are sometimes referred to as node B.

It should be appreciated that whilst embodiments of the present invention have been described in the context of a CDMA system, embodiments of the present invention can be used with any other spread spectrum technique, with time division multiple access systems, frequency division multiple access and hybrids thereof.

Thus, while there have been shown and described and pointed out fundamental novel features of the present invention as applied to preferred embodiments thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method comprising: selecting a first or second mode of operation, if the first mode is selected, operating in the first mode in which information is transmitted by a first station to a plurality of second stations on a common channel, different information being intended for different stations, wherein said information intended for different second stations are transmitted at different power levels, and said first station receives information from a radio network controller on the power with which information for a respective second station is to be transmitted, if the second mode is selected, operating in the second mode of operation in which the first station sends information to said plurality of second stations on said common channel with substantially the same power level.

2. The method of claim 1, wherein the power level with which information is transmitted is selected in dependence on at least one of a parameter of the intended second station and the content of the information.

3. The method of claim 1, wherein the power level with which information is transmitted is selected in dependence on at least one of a parameter of the intended second station and the content of the information.

4. The method of claim 1, wherein said information is in the form of data packets.

5. The method of claim 1, wherein said information for a given second station includes information identifying the given station.

6. The method of claim 1, wherein the controller is configured to send a channel configuration message to the first station to control which of said first and second modes is to be used.

7. The method of claim 6, wherein said first station is configured to send a message to said controller advising the controller if it can perform the mode contained in the channel configuration message.

8. The method of claim 1, wherein said controller is configured to send a channel configuration message to the first station to advise the first station as to the range of power levels to be used to transmit information to the second stations.

9. The method of claim 1, wherein values representing the power levels are sent to the first station by said controller, said values being mapped to the power levels which are used by said first station to transmit information to said second station.

10. The method of claim 1, wherein said controller is a radio network controller.

11. The method of claim 1, wherein said first station is a base station.

12. The method of claim 1, wherein said second stations comprise mobile stations.

13. The method of claim 1, wherein said common channel is a forward access channel.

14. The method of claim 1, wherein the common channel is a code division multiple access channel.

15. A method comprising: selecting a first or second mode of operation, if the first mode is selected, operating in the first mode in which information in the form of frames is transmitted by the first station to a plurality of second stations on a common channel, different frames being intended for different stations, said frames being transmitted with a same power, and if the second mode is selected, operating in the second mode in which different powers are used for the transmission by said first station of data frames on the common channel intended for different stations.

16. A method comprising: selecting a first or second mode of operation, if the first mode is selected, operating in the a first mode in which information in the form of frames is transmitted by a first station to a plurality of second stations on a common code division multiple access channel, different frames being intended for different stations, said information being transmitted with a same power and, if the second mode is selected, operating in the second mode in which said first station transmits to the plurality of second stations on the common code division multiple access channel, wherein different powers are used for frames intended for different second stations.

17. A network comprising:
a first station;
a plurality of second stations; and
a radio network controller;
wherein said first station is configured to transmit different information intended for different second stations on a common channel, said common channel being a forward transport channel, said first station having a mode of operation in which said first station is configured to transmit information intended for different second stations on the common channel at different power levels, and said radio network controller is configured to supply power information to said first station as to the power to be used for said information.

18. The network of claim 17, wherein said power level is selected in dependence on at least one of a parameter of the intended second station and the content of the information.

19. The network of claim 17, wherein said controller is a radio network controller, said first station is a base station and said second stations are user terminals.

20. The network of claim 17, wherein information sent from said controller to the base station comprises said power information and said information for a second station.

21. The network of claim 17, wherein a second mode of operation is provided in which the first station sends information to said second stations with substantially the same power level, one of said first and second modes being selected.

22. The network of claim 21, wherein said first station is configured to send a message to said controller advising the controller if it can perform the mode contained in the channel configuration message.

23. The network of claim 17, wherein the controller is configured to send a channel configuration message to the first station to control which of said first and second modes is to be used.

24. The network of claim 17, wherein said controller is configured to send a channel configuration message to the first station to advise the first station as to the range of power levels to be used to transmit information to the second stations.

25. The network of claim 17, wherein said information is in the form of data packets.

26. The network of claim 17, wherein said information for a given second station includes information identifying the given station.

27. The network of claim 17, wherein said power level is selected in dependence on at least one of a parameter of the intended second station and the content of the information.

28. The network of claim 17, wherein the common channel is a code division multiple access channel.

29. A method comprising:
transmitting information by a first station to a plurality of second stations on a common channel, said common channel being a forward transport channel, different information being intended for different stations, wherein said information intended for different second stations are transmitted at different power levels; and
receiving by said first station information from a controller on the power with which information for a respective second station is to be transmitted, said information comprising a channel configuration message advising the first station as to the range of power levels to be used to transmit information to the second stations.

30. The method of claim 29, wherein the common channel is a code division multiple access channel.

31. A network comprising;
a first station; and
a plurality of second stations;
wherein said first station is configured to transmit different information in the form of frames intended for different second stations on a common channel, said first station having a mode selector configured to select either a first mode of operation in which said first station is configured to transmit frames intended for different second stations on the common channel at different power levels or a second mode of operation in which the first station sends frames to said second stations with substantially the same power level.

32. The network of claim 31, wherein the common channel is a code division multiple access channel.

33. A radio network controller comprising:
a processor configured to determine power levels for the power with which respective frames are to be transmitted by a base station to a plurality of user terminals on a common channel, said common channel being a forward transport channel, with different frames on said channel are intended for different user terminals such that said different frames intended for different user terminals are transmitted by the base station at different power levels on said common channel; and
a transmitter configured to transmit the determined power levels to the base station.

34. An apparatus comprising:
a transmitter configured to transmit information in the form of frames to a plurality of user terminals on a common channel, said common channel being a forward transport channel, with different frames of said information being intended for different user terminals and transmitted at different power levels; and
a receiver configured to receive power levels for respective frames from a radio network controller for the power with which said respective frame for a respective user is to be transmitted on said common channel.

35. An apparatus comprising:
a transmitter; and
a mode selector configured to select a first mode of operation or a second mode of operation, wherein if said first mode is selected said transmitter is configured to transmit information in the form of frames to a plurality of second stations on a common channel, with different frames being intended for different stations, said information being transmitted with a same power and if said second mode is selected, the transmitter is configured to transmit to the plurality of second stations on the common channel, wherein different powers are used for frames intended for different second stations.

* * * * *